(12) United States Patent
Aoki

(10) Patent No.: US 7,460,060 B2
(45) Date of Patent: Dec. 2, 2008

(54) ELECTROMAGNETIC WAVE TRANSMITTING/RECEIVING MODULE AND IMAGING SENSOR HAVING ELECTROMAGNETIC WAVE TRANSMITTING/RECEIVING MODULE

(75) Inventor: Yutaka Aoki, Nisshin (JP)

(73) Assignee: Denso Corporation, Kariya (JP)

( * ) Notice: Subject to any disclaimer, the term of this patent is extended or adjusted under 35 U.S.C. 154(b) by 46 days.

(21) Appl. No.: 11/390,665

(22) Filed: Mar. 28, 2006

(65) Prior Publication Data

US 2006/0220952 A1  Oct. 5, 2006

(30) Foreign Application Priority Data

Mar. 30, 2005  (JP)  ............... 2005-098678

(51) Int. Cl.
*G01S 13/89* (2006.01)
*G01S 7/02* (2006.01)
*H01Q 15/02* (2006.01)
*H01Q 3/00* (2006.01)
*G01S 13/00* (2006.01)

(52) U.S. Cl. ............... 342/179; 342/22; 342/73; 342/74; 342/81; 342/82; 342/89; 342/175; 342/176; 342/195; 342/368; 343/907; 343/909

(58) Field of Classification Search ...... 342/25 R–25 F, 342/82–103, 175, 176, 179, 195, 22, 59, 342/73–81, 368–377; 359/237; 333/100, 333/124, 125; 343/908, 910, 911 R, 911 L, 343/912–916, 907, 909
See application file for complete search history.

(56) References Cited

U.S. PATENT DOCUMENTS 5,047,783 A  *  9/1991  Hugenin ............... 342/179

5,170,169 A  *  12/1992  Stephan ............... 342/179
5,760,397 A  6/1998  Huguenin et al.
5,861,839 A  1/1999  Upton et al.
6,075,493 A  6/2000  Sugawara et al.

(Continued)

FOREIGN PATENT DOCUMENTS

JP  06-331725  12/1994

(Continued)

OTHER PUBLICATIONS

"Monolithic Millimeter-Wave Two-Dimensional Horn Imaging Arrays", IEEE Transactions on Antennas and Propagation, vol. 38, No. 9, Sep. 1990, pp. 1473-1482.

(Continued)

*Primary Examiner*—Bernarr E Gregory
(74) *Attorney, Agent, or Firm*—Harness, Dickey & Pierce, PLC

(57) ABSTRACT

An electric wave transmitting/receiving module includes: a waveguide including a conductive member and an opening facing a transmitting side and/or a receiving side; a dielectric substrate disposed on a side opposite to the opening of the waveguide; and transmitting/receiving means. The transmitting/receiving means includes a core line, a transmitting/receiving element, and a wire. The core line and the transmitting/receiving element are horizontally disposed on the dielectric substrate. The core line transmits the transmitting electric wave and/or receives the receiving electric wave. The transmitting/receiving element outputs a transmitting/receiving signal corresponding to the transmitting electric wave and/or the receiving electric wave. The wire sends the transmitting/receiving signal from the transmitting/receiving element to an external circuit.

31 Claims, 8 Drawing Sheets

U.S. PATENT DOCUMENTS

| | | | |
|---|---|---|---|
| 6,232,931 B1 * | 5/2001 | Hart | 343/909 |
| 6,587,246 B1 | 7/2003 | Anderton et al. | |
| 6,750,999 B1 * | 6/2004 | Chiao | 359/237 |
| 6,777,684 B1 * | 8/2004 | Volkov et al. | 342/179 |
| 6,876,272 B2 * | 4/2005 | DeLisio et al. | 333/125 |
| 6,992,616 B2 * | 1/2006 | Grudkowski et al. | 342/179 |
| 7,119,740 B2 * | 10/2006 | Blasing et al. | 342/179 |

FOREIGN PATENT DOCUMENTS

| | | |
|---|---|---|
| JP | 09-027927 | 1/1997 |
| JP | 11-330846 | 11/1999 |
| JP | 2003-198943 | 7/2003 |
| JP | 2004-093382 | 3/2004 |

OTHER PUBLICATIONS

Fundamentals and Applications of Milliwave Technology; p. 407; no author given; no date given; no publisher given. In Japanese.

* cited by examiner

ELECTROMAGNETIC WAVE TRANSMITTING/RECEIVING MODULE AND IMAGING SENSOR HAVING ELECTROMAGNETIC WAVE TRANSMITTING/RECEIVING MODULE

CROSS REFERENCE TO RELATED APPLICATION

This application is based on Japanese Patent Application No. 2005-98678 filed on Mar. 30, 2005, the disclosure of which is incorporated herein by reference.

FIELD OF THE INVENTION

The present invention relates to an electric wave transmitting/receiving module for electric wave communication and an imaging sensor having an electric wave transmitting/receiving module.

BACKGROUND OF THE INVENTION

In recent years, there have been great needs of communication systems and sensing systems which employ the high frequencies of milliwaves, etc. Especially in a milliwave sensing system, a milliwave imaging sensor capable of sensing the shape of a target in all weathers has been greatly needed. The milliwave imaging sensor is classified into an active type wherein the milliwaves are transmitted to the target, so as to sense the target shape on the basis of the reflected waves of the milliwaves, and a passive type wherein the target shape is sensed on the basis of the milliwaves radiated by the target or from surroundings. It is known that, although the passive type milliwave imaging needs to detect radio waves feebler (i.e., weaker) than in the active type, it is higher in imaging resolution than the active type.

Now, the principle of the passive milliwave imaging will be outlined.

According to the Planck's law of radiation, any object radiates an electromagnetic wave which is determined by the temperature of the object, and an emissivity that depends upon the material of the surface of the object and an angle defined between a surface bearing (i.e., surface orientation) and a radiation bearing (i.e., radiation orientation). The radiated electromagnetic wave has its peak power in the region of infrared light, but it has feeble radiation also in the radio-wave bandwidth of a milliwave band and a microwave band. Radiation power P [W] in the milliwave band can be expressed as $P = k \Delta f (\in T) [W]$ (hereinbelow, termed "Formula 1", which is Rayleigh-Jean's approximate formula). Here, k[J/K] denotes the Boltzmann's constant, $\Delta f$ [Hz] denotes an observation bandwidth, T [K] denotes the physical temperature of the target, and $\in$ denotes the emissivity.

Recently, there are great needs of the passive type milliwave imaging sensor in which the shape of the object is recognized by receiving the radiation power in the milliwave band. It is known that, as shown in FIG. 20, the milliwave is higher than visible light in a transmission factor in a mist. FIG. 20 shows a relationship between frequency and attenuation constant in mist atmosphere. By way of example, the transmittivity of the milliwave is stated on page 207 in "Fundamentals and Applications of Milliwave Technology" issued by Kabushiki-Kaisha Realize Inc. (issued on Jul. 31, 1998, first edition, "Fundamentals and Applications of Milliwave Technology" Editing Committee). By reason of the high transmission factor, the passive type milliwave imaging sensor is greatly expected as the imaging sensor which is not influenced by the weathers.

At present, a method employing a flat patch antenna and a sensing circuit as disclosed in Japanese Patent No. 3,263,282 and JP-A-6-331725 is known as to the sensing module of the milliwave imaging sensor. In addition, there is known a method employing a tapered slot antenna and a sensing circuit as disclosed in JP-A-10-332824, JP-A-11-163626 and JP-A-11-330846. The "tapered slot antenna" is such that a thin metal plate whose central part is cut off in a taper shape is stuck on a flat glass sheet. Such tapered slot antennas are arranged as an array, and are used as the imaging sensor.

Further, a structure wherein a waveguide horn and a flat antenna are combined is known as disclosed on pp. 1473-1482 in "IEEE Transactions on Antennas and Propagation", Vol. 38, No. 9, September, 1990. With the structure, a membrane (thin film) of silicon oxide is disposed perpendicularly to the propagation direction of the milliwave, within the horn antenna, and the flat antenna is located in a place where the membrane floats relative to the horn antenna, so that reduction in a depthwise dimension is possible.

The flat patch antenna has a broad directivity. Therefore, when it is employed in combination with a lens, it exhibits the directivity in an unnecessary range. Besides, it has a narrow band, and the reception power intensity thereof depends upon the band (Formula 1). Accordingly, the flat patch antenna has the problem that it is unsuitable for the milliwave imaging.

Besides, the tapered slot antenna has a directivity of end fire type, and it features the presentation of the directivity in a direction horizontal to a substrate. Such a structure poses the structural problem that the shape of the module cannot be made small in the depthwise direction thereof.

Further, the structure wherein the membrane is floated within the horn is structurally complicated and is low in strength. Therefore, performances disperse among elements, and imaging or the like in which uniform performances are required for all the elements is difficult of realization. Besides, since a bolometer is employed for the flat antenna, the structure is less immune against ambient temperature changes.

SUMMARY OF THE INVENTION

In view of the above-described problem, it is an object of the present invention to provide an electric wave transmitting/receiving module. It is another object of the present invention to provide an imaging sensor employing an electric wave transmitting/receiving module.

An electric wave transmitting/receiving module includes: a waveguide including a conductive member and an opening, wherein the conductive member is disposed on an inner periphery of the opening of the waveguide, and wherein the opening of the waveguide faces a transmitting side of a transmitting electric wave and/or a receiving side of a receiving electric wave; a dielectric substrate perpendicular to a transmitting direction of the transmitting electric wave and/or a receiving direction of the receiving electric wave, and disposed on a side opposite to the opening of the waveguide; and transmitting/receiving means for transmitting the transmitting electric wave and/or for receiving the receiving electric wave. The transmitting/receiving means includes a core line, a transmitting/receiving element, and a wire. The core line is horizontally disposed on the dielectric substrate. The core line transmits the transmitting electric wave and/or receives the receiving electric wave. The transmitting/receiving element is horizontally disposed on the substrate. The transmitting/receiving element outputs a transmitting/receiving signal corresponding to the transmitting electric wave and/or the receiving electric wave. The wire sends the transmitting/receiving signal from the transmitting/receiving element to an external circuit.

In the above module, since the waveguide is used for transmitting and/or receiving the electric wave, the module can inputs and/or outputs the electric wave having a wide bandwidth. Further, the transmitting/receiving means is horizontally formed on the substrate, which is disposed at the bottom of the waveguide, so that the dimensions of the module are minimized.

Further, an imaging sensor includes: a module array including a plurality of electric wave transmitting/receiving modules. The electric wave transmitting/receiving modules are disposed to be a predetermined array. The lens in each electric wave transmitting/receiving module is disposed on an opening side of the electric wave transmitting/receiving module, and the external circuit is capable of processing the transmitting/receiving signal outputted from each electric wave transmitting/receiving module. The imaging sensor can detect the shape of an object. The dimensions of the sensor in the depth direction is minimized.

Furthermore, an imaging sensor includes: a electric wave transmitting/receiving module; driving means for moving the electric wave transmitting/receiving module in a predetermined area; and position detection means for detecting a positioning of the electric wave transmitting/receiving module in the predetermined area and for outputting a positioning signal. The lens refracts and focuses the receiving electric wave on the opening of the electric wave transmitting/receiving module, and the external circuit is capable of processing the transmitting/receiving signal and the positioning signal. The imaging sensor can detect the shape of an object. The construction of the sensor is simplified.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

A first embodiment will be described with reference to FIGS. 1A and 1B and FIG. 2.

Figure 1A:
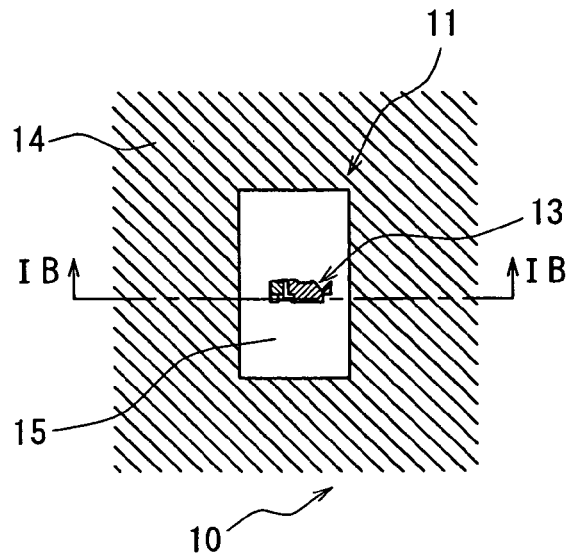
FIG. 1A is a perspective view showing a radio-wave reception module according to a first embodiment of the present invention.
Figure 1B:
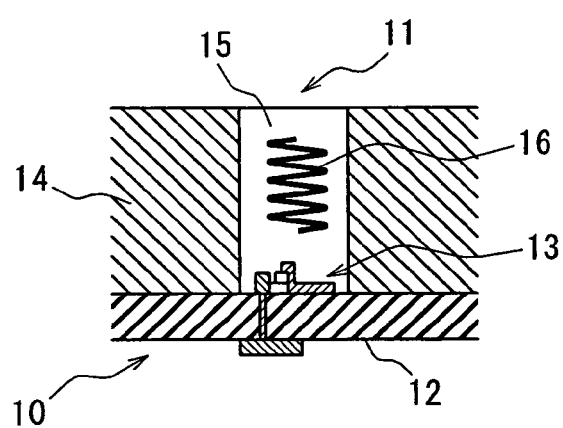
FIG. 1B is a cross sectional view showing the module taken along line IB-IB in FIG. 1A.

FIGS. 1A and 1B illustrate the relationship among a tubular waveguide 11, a dielectric substrate 12 and reception means 13 which constitute a radio-wave reception module 10. FIG. 1A is a perspective view of the radio-wave reception module 10, while FIG. 1B is a sectional view taken along line IB-IB in FIG. 1A. The module 10 includes the waveguide 11 having a cylindrical shape, and reception means 13 is disposed on a side of the substrate 12, on which the waveguide 11 contacts.

As shown in FIGS. 1A and 1B, a metal plate 14 is provided with a penetrating hole 15 so as to form the tubular waveguide 11. Further, the resulting metal plate 14 is joined to the dielectric substrate 12 on which the reception means 13 to be explained later is mounted. By the way, in this embodiment, the material of the dielectric substrate 12 is alumina. Besides, a milliwave 16 inputted as a reception wave passes through the tubular waveguide 11, and it is received by the reception means 13.

Figure 2:
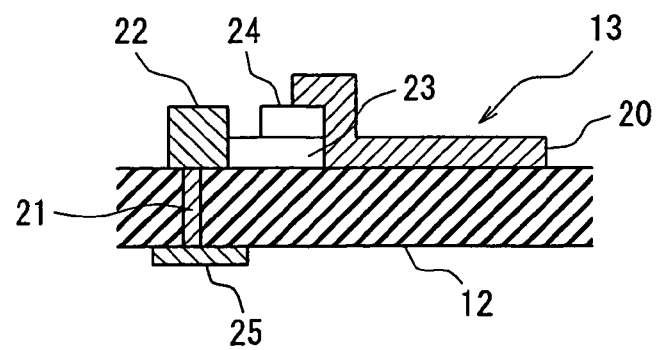
FIG. 2 is a partially enlarged cross sectional view showing the module in FIG. 1B.

FIG. 2 is a detailed view of the reception means 13. As shown in FIG. 2, a core line 20 and a pad 22 are formed on that identical surface of the dielectric substrate 12 which lies in touch with the tubular waveguide 11. Besides, a via hole 21 which pierces the dielectric substrate 12 is formed. A Schottky barrier diode (hereinafter, abbreviated to "SBD") which is a reception element and which is constituted by a cathode 23 and an anode 24, is mounted on the same plane as that of the dielectric substrate 12 and between the core line 20 and the pad 22. Further, the anode 24 is connected with the core line 20, and the cathode 23 is connected with the pad 22. The pad 22 is connected through the via hole 21 to a wiring line 25 disposed on that surface of the dielectric substrate 12 which does not lie in touch with the tubular waveguide 11.

Owing to this structure, the milliwave 16 having arrived from outside is received by the core line 20 with the tubular waveguide 11 as an antenna, and it is thereafter detected and converted into a voltage by the SBD. The wiring line 25, which is at a potential equal to that of the SBD, has the potential measured by a digital voltmeter, whereby the received milliwave 16 is outputted as a reception signal.

Owing to the above configuration, the radio-wave reception module 10 is less susceptible to ambient temperatures by employing the SBD as the reception element, and it is simple in arrangement. Besides, since the tubular waveguide 11 is employed, milliwaves 16 in a wide band can be received. Further, the core line 20 for receiving the milliwave 16, and the reception means 13 including the reception element are disposed in a horizontal direction on the same plane as that of the dielectric substrate 12, whereby reduction in size and rigidification in structure are compatible.

Second Embodiment

The point of the configurational difference of a second embodiment from the first embodiment described above is that semi-insulating Si and semi-insulating GaAs being semiconductors are employed for the dielectric substrate 12 in the second embodiment, though the alumina is employed in the first embodiment. Incidentally, constituents equivalent to those of the first embodiment described above are assigned the same reference numerals as in the first embodiment, and they shall be omitted from the description of the second embodiment.

In an example, using a molecular-beam crystal growth apparatus, a p-type GaAs layer having a thickness of 1 μm is grown on a semi-insulating GaAs substrate by employing Si as a donor impurity, and at an impurity density of 1E19 [$cm^{-3}$], and an n-type GaAs layer having a thickness of 1 μm is grown on the p-type GaAs layer at an impurity density of 1E17 [$cm^{-3}$]. Incidentally, the p-type GaAs layer having the impurity density of 1E19 [$cm^{-3}$] corresponds to the anode 24 in the first embodiment, while the n-type GaAs layer having the impurity density of 1E17 [$cm^{-3}$] corresponds to the cathode 23 in the first embodiment. The grown layers are subjected to etching removal steps of two stages, into the stepped shape of the anode 24 and the cathode 23 shown in FIG. 2. An ohmic contact metal is formed on that part of the p-type GaAs layer, which is not hidden by the n-type GaAs layer, and a Schottky contact is formed on the n-type GaAs layer. A SiN film is formed as a passivation film on the resulting structure, and contact holes are respectively provided on the ohmic contact and the Schottky contact. Thereafter, a core line 20 and a pad 22 are formed by gold plating. Subsequently, the rear surface of the substrate 12 is polished till a substrate thickness of 100 μm, and a via hole 21 is provided and is filled up by plating. Lastly, a wiring line 25 joined to the via hole 21 is formed.

In this manner, the radio-wave reception module 10 of the second embodiment is formed by the semiconductor process, and hence, impedance matching can be established at a precision higher than in the first embodiment.

Third Embodiment

The point of the configurational difference of the third embodiment from the first embodiment described above is that a plate of high donor density is employed as the material of a tubular waveguide 11 in the third embodiment, though the metal plate 14 is employed in the first embodiment. Incidentally, constituents equivalent to those of the foregoing embodiments are assigned the same reference numerals as in the foregoing embodiments, and they shall be omitted from the description of the third embodiment.

The Si plate of high donor density is provided with a metal film which has openings equal in size to those of the penetrating hole 15 of the tubular waveguide 11 shown in FIGS. 1A and 1B, by employing a photo-process. Dry etching is performed using the metal film as a mask, thereby to provide the penetrating hole 15 of the tubular waveguide 11. Thereafter, the metal film is removed, thereby to obtain the Si plate having the tubular waveguide 11. A dielectric substrate 12 which is provided with reception means 13 employed in each of the foregoing embodiments is stacked on the Si plate having the tubular waveguide 11, so as to cover one of the openings of the penetrating hole 15 formed in the Si plate.

In this way, the radio-wave reception module 10 of the third embodiment can bring forth, not only the advantages attained by the first embodiment, but also the advantage that the tubular waveguide 11 can be formed by the semiconductor process. Accordingly, the products of the radio-wave reception module 10 of high processing precision can be manufactured in large quantities.

Fourth Embodiment

The fourth embodiment will be described with reference to FIG. 3. The point of the configurational difference of the fourth embodiment from the first embodiment described before is that a semi-insulating Si plate 30 is employed as the material of a tubular waveguide 11 in Embodiment 4, though the metal plate 14 is employed in the first embodiment. Incidentally, constituents equivalent to those of the foregoing embodiments are assigned the same reference numerals as in the foregoing embodiments, and they shall be omitted from the description of the fourth embodiment. The module 10 includes the waveguide 11 having a cylindrical shape, and reception means 13 is disposed on a side of the substrate 12, on which the waveguide 11 contacts. The waveguide 11 includes a plating layer 31.

Figure 3:
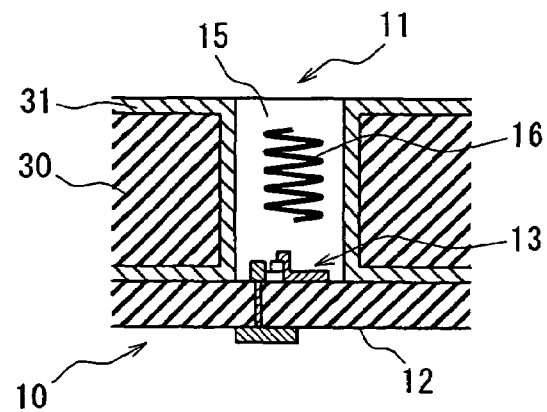
FIG. 3 is a perspective view showing a radio-wave reception module according to a fourth embodiment of the present invention.

As shown in FIG. 3, the semi-insulating Si plate 30 is provided with a metal film which has openings equal in size to those of the penetrating hole 15 of the tubular waveguide 11 shown in FIGS. 1A and 1B, by employing a photo-process. Dry etching is performed using the metal film as a mask, thereby to provide the penetrating hole 15 of the tubular waveguide 11. Thereafter, the metal film is removed, whereby the semi-insulating Si plate 30 having the tubular waveguide 11 can be obtained. Further, the whole surface of the semi-insulating Si plate 30 having the tubular waveguide 11 is formed with a metal film by sputtering. Subsequently, electrodes are attached to the resulting structure, and a plating layer 31 is formed on the whole surface by an electrolytic plating process. As shown in FIG. 3, a dielectric substrate 12 which is provided with reception means 13 employed in the foregoing embodiment is stacked on the semi-insulating Si plate 30 having the tubular waveguide 11 subjected to the plating process, so as to cover one of the openings of the penetrating hole 15 formed in the semi-insulating Si plate 30.

In this way, the radio-wave reception module 10 of the fourth embodiment can bring forth, not only the advantages attained by the first embodiment, but also the advantage that the penetrating hole 15 of the tubular waveguide 11 can be provided by the semiconductor process. Therefore, the articles of the tubular waveguide 11 can be manufactured in large quantities at a high precision and with a dispersion held small.

Incidentally, the configuration of the fourth embodiment is realizable by employing a Si plate of high resistance or a Si plate of low donor density instead of the semi-insulating Si plate 30.

Fifth Embodiment

A fifth embodiment will be described with reference to FIGS. 4A and 4B. The point of the configurational difference of the fifth embodiment from the first embodiment described before is that a horn-shaped waveguide 40 is employed in the fifth embodiment, though the tubular waveguide 11 is employed in the first embodiment. Incidentally, constituents equivalent to those of the first embodiment are assigned the same reference numerals as in the first embodiment, and they shall be omitted from the description of the fifth embodiment. The module 10 includes the waveguide 40 having a horn shape, and reception means 13 is disposed on a side of the substrate 12, on which the waveguide 40 contacts.

Figure 4A:
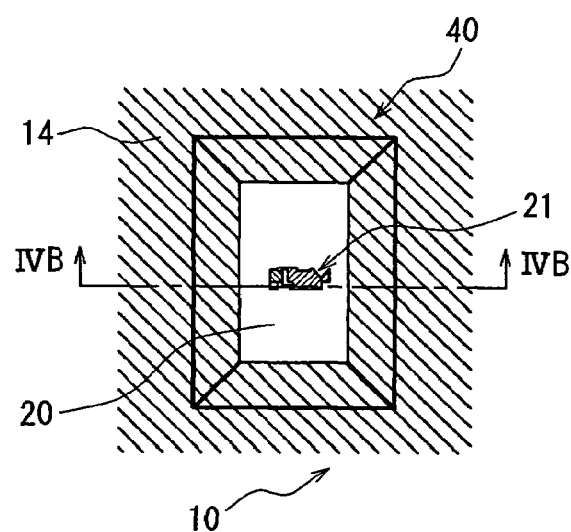
FIG. 4A is a perspective view showing a radio-wave reception module according to a fifth embodiment of the present invention.
Figure 4B:
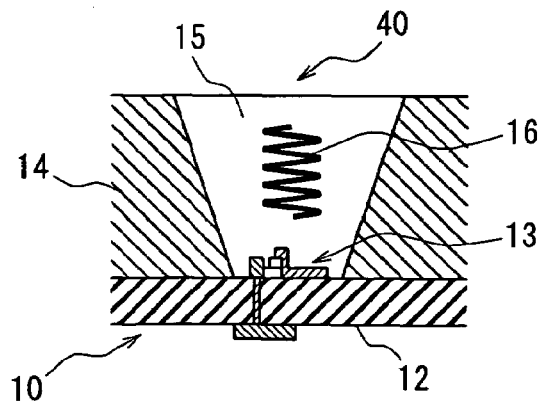
FIG. 4B is a cross sectional view showing the module taken along line IVB-IVB in FIG. 4A.

FIGS. 4A and 4B illustrate the relationship among the horn-shaped waveguide 40, a dielectric substrate 12 and reception means 13 which constitute a radio-wave reception module 10. FIG. 4A is a bird's-eye view of the radio-wave reception module 10, while FIG. 4B is a sectional view taken along line IVB-IVB in FIG. 4A.

As shown in FIGS. 4A and 4B, the horn-shaped waveguide 40 is a metal plate 14 which is provided with a penetrating hole 15. The penetrating hole 15 of the horn-shaped waveguide 40 is a pyramidal aperture whose sectional shapes enlarges similarly as they become remoter from the dielectric substrate 12. Further, the dielectric substrate 12 which is provided with the reception means 13 employed in the first embodiment described before is stacked on the surface of the horn-shaped waveguide 40 provided in the metal plate 14, this surface having a smaller open area. Thus, an inputted milli-wave 16 passes through the horn-shaped waveguide 40 and is received by the reception means 13.

Owing to this structure, the radio-wave reception module 10 of the fifth embodiment brings forth the same advantages as in the first embodiment, and it can attain a directivity and a gain which are higher than in the first embodiment, because of the employment of the horn-shaped waveguide 40.

Sixth Embodiment

The point of the configurational difference of the sixth embodiment from the fifth embodiment described above is that a GaAs plate of high donor density is employed as the material of a horn-shaped waveguide 40 in the sixth embodiment, though the metal plate 14 is employed in the fifth embodiment. Incidentally, constituents equivalent to those of the foregoing embodiments are assigned the same reference numerals as in the foregoing embodiments, and they shall be omitted from the description of the sixth embodiment.

The GaAs plate of high donor density is provided with a resist film having an aperture which is similar to the penetrating hole 15 of the horn-shaped waveguide 40 shown in FIGS. 4A and 4B, but which is smaller in size, by employing a photo-process. The GaAs plate provided with the resist film is subjected to wet etching with an etchant which consists of $H_2SO_4:H_2O_2:H_2O=4:1:135$, thereby to provide the penetrating hole 15 of the horn-shaped waveguide 40. Thereafter, the resist film is removed, thereby to obtain the GaAs plate of high donor density having the horn-shaped waveguide 40. The dielectric substrate 12 which is provided with the reception means 13 employed in the foregoing embodiment is stacked on the surface of the horn-shaped waveguide 40 provided in the GaAs plate of high donor density, this surface having a smaller open area.

In this way, the radio-wave reception module 10 of the sixth embodiment can bring forth, not only the advantages attained by the fifth embodiment, but also the advantage that the antenna can be formed by the semiconductor process. Accordingly, the products of the radio-wave reception module 10 of high processing precision can be manufactured in large quantities.

Seventh Embodiment

A seventh embodiment will be described with reference to FIG. 5. The point of the configurational difference of the seventh embodiment from the fifth embodiment described before is that a semi-insulating GaAs plate 50 is employed as the material of a horn-shaped waveguide 40 in the seventh embodiment, though the metal plate 14 is employed in the fifth embodiment. Incidentally, constituents equivalent to those of the foregoing embodiments are assigned the same reference numerals as in the foregoing embodiments, and they shall be omitted from the description of the seventh embodiment. The module 10 includes the waveguide 40 having a horn shape, and reception means 13 is disposed on a side of the substrate 12, on which the waveguide 11 contacts. The waveguide 40 includes a plating layer 31.

Figure 5:
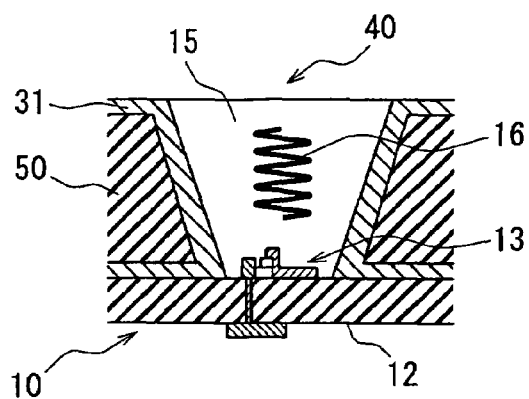
FIG. 5 is a perspective view showing a radio-wave reception module according to a seventh embodiment of the present invention.

As shown in FIG. 5, the semi-insulating GaAs plate 50 is provided with a resist film having an aperture which is similar to the penetrating hole 15 of the horn-shaped waveguide 40 shown in FIGS. 4A and 4B, but which is smaller in size, by employing a photo-process. The GaAs plate provided with the resist film is subjected to wet etching with an etchant which consists of $H_2SO_4:H_2O_2:H_2O=4:1:135$, thereby to provide the penetrating hole 15 of the horn-shaped waveguide 40. Thereafter, the resist film is removed, whereby the semi-insulating GaAs plate 50 having the horn-shaped waveguide 40 can be obtained. Further, the whole surface of the semi-insulating GaAs plate 50 having the horn-shaped waveguide 40 is formed with a metal film by sputtering. Subsequently, electrodes are attached to the resulting structure, and a plating layer 31 is formed on the whole surface by an electrolytic plating process.

As shown in FIG. 5, a dielectric substrate 12 which is provided with reception means 13 employed in the foregoing embodiment is stacked on the surface of the horn-shaped waveguide 40 provided in the semi-insulating GaAs plate 50 formed with the plating layer 31, this surface having a smaller open area.

In this way, the radio-wave reception module 10 of the seventh embodiment can bring forth, not only the advantages attained by the fifth embodiment, but also the advantage that the penetrating hole 15 of the horn-shaped waveguide 40 can be provided by the semiconductor process. Therefore, the articles of the horn-shaped waveguide 40 can be manufactured in large quantities at a high precision and with a dispersion held small.

Incidentally, the configuration of the seventh embodiment is realizable by employing a GaAs plate of high resistance or a GaAs plate of low donor density instead of the semi-insulating GaAs plate 50.

Eighth Embodiment

An eighth embodiment will be described with reference to FIGS. 6 and 7. The points of the configurational difference of the eighth embodiment from the first embodiment described before are that, in the eighth embodiment, reception means 60 is located on the rear surface of a dielectric substrate 12, namely, on the surface thereof not lying in touch with a tubular waveguide 11, and that the configuration of the reception means 60 is different. Incidentally, constituents equivalent to those of the foregoing embodiments are assigned the same reference numerals as in the foregoing embodiments, and they shall be omitted from the description of the eighth embodiment. The module 10 includes the waveguide 11 having a cylindrical shape, and reception means 60 is disposed on a side of the substrate 12, on which the waveguide 11 does not contact.

Figure 6:
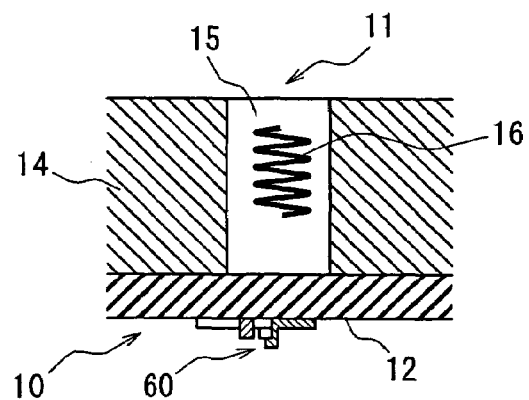
FIG. 6 is a perspective view showing a radio-wave reception module according to an eighth embodiment of the present invention.

FIG. 6 illustrates the relationship among the tubular waveguide 11, the dielectric substrate 12 and the reception means 60. FIG. 6 differs from FIG. 1B referred to in the first embodiment described before, in the points of the configuration of the reception means 60, and the fact that the reception means 60 is located on the surface of the dielectric substrate 12 as is not connected with the tubular waveguide 11.

Figure 7:
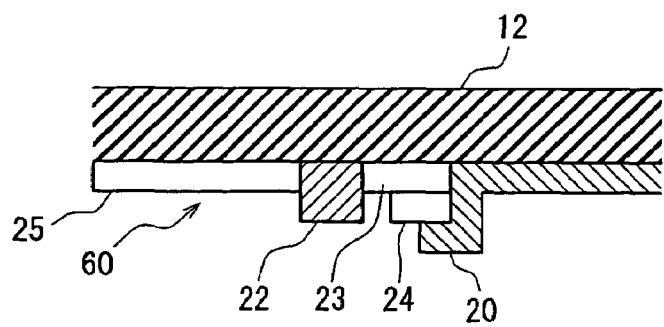
FIG. 7 is a partially enlarged cross sectional view showing the module in FIG. 6.

FIG. 7 is a detailed view of the reception means 60, the configuration of which will now be explained. A core line 20, a pad 22, and an SBD which is constituted by a cathode 23 and an anode 24, are mounted on the surface of the dielectric substrate 12 opposite to the surface thereof lying in touch with the tubular waveguide 11. Further, on the same surface of the dielectric substrate 12, the anode 24 is connected with the core line 20, the cathode 23 is connected with the pad 22, and the pad 22 is connected with a wiring line 25.

Owing to this structure, a milliwave 16 having arrived from outside passes through the tubular waveguide 11 as well as the dielectric substrate 12 and is received by the core line 20, and it is thereafter detected and converted into a voltage by the SBD. The wiring line 25, which is at a potential equal to that of the SBD, has the potential measured by a digital voltmeter, whereby the received milliwave 16 is outputted as a reception signal.

In this way, the radio-wave reception module 10 of the eighth embodiment has, not only the advantages attained by the first embodiment, but also the advantage that the reception means 60 is located on the rear surface of the dielectric substrate 12, so a region where circuits and elements are arranged is large in area, and a filter circuit, etc. can be disposed in addition to the reception means 60. Besides, since the core line 20 and the reception means 60 exist on the same plane, the via hole (21 in FIG. 2) or the like need not be formed in the dielectric substrate 12, and the manufacture of the module 10 is facilitated.

Figure 8:
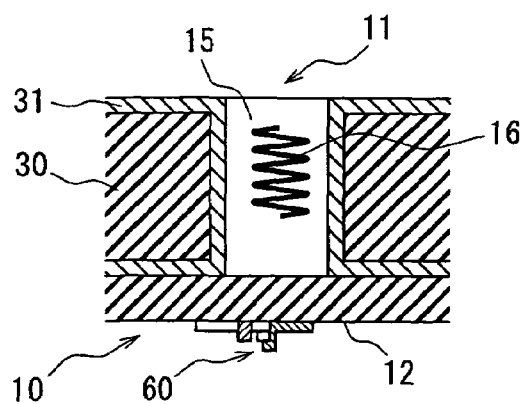
FIG. 8 is a perspective view showing a radio-wave reception module according to a modification of the eighth embodiment of the present invention.
Figure 9:
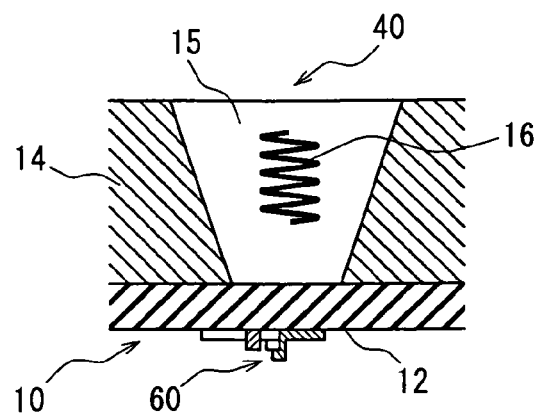
FIG. 9 is a perspective view showing a radio-wave reception module according to another modification of the eighth embodiment of the present invention.
Figure 10:
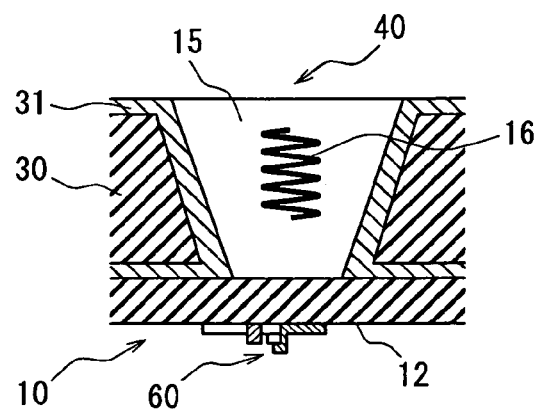
FIG. 10 is a perspective view showing a radio-wave reception module according to further another modification of the eighth embodiment of the present invention.

Incidentally, although the tubular waveguide 11 in which a penetrating hole 15 is provided in a metal plate 14 has been exemplified in this embodiment, it is also allowed to adopt a tubular waveguide 11 employing a semi-insulating Si plate 30 as shown in FIG. 8, a horn-shaped waveguide 40 employing a metal plate 14 as shown in FIG. 9, or a horn-shaped waveguide 40 employing a semi-insulating Si plate 30 as shown in FIG. 10. In FIG. 8, the module 10 includes the waveguide 11 having a cylindrical shape, the reception means 60 is disposed on a side of the substrate 12, on which the waveguide 11 does not contact, and the waveguide 11 includes the plating layer 31. In FIG. 9, the module 10 includes the waveguide 40 having a horn shape, and reception means 60 is disposed on a side of the substrate 12, on which the waveguide 40 does not contact. In FIG. 10, the module 10 includes the waveguide 40 having a horn shape, the reception means 60 is disposed on a side of the substrate 12, on which the waveguide 40 does not contact, and the waveguide 40 includes the plating layer 31.

Ninth Embodiment

A ninth embodiment will be described with reference to FIGS. 11 and 12. The points of the configurational difference of the ninth embodiment from the eighth embodiment described above are that a via hole 21 is provided in a dielectric substrate 12 in the ninth embodiment, and that a core line 20 constituting reception means 110 passes through the via hole 21 and exists on the surface of the dielectric substrate 12 lying in touch with a waveguide 11. Incidentally, constituents equivalent to those of the foregoing embodiments are assigned the same reference numerals as in the foregoing embodiments, and they shall be omitted from the description of the ninth embodiment. The module 10 includes the waveguide 11 having a cylindrical shape, the reception means 110 other than the core line 20 is disposed on a side of the substrate 12, on which the waveguide 40 does not contact.

Figure 11:
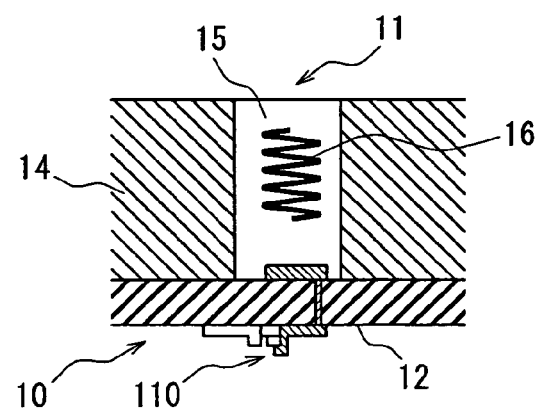
FIG. 11 is a perspective view showing a radio-wave reception module according to a ninth embodiment of the present invention.

FIG. 11 illustrates the relationship among the tubular waveguide 11, the dielectric substrate 12 and the reception means 110. FIG. 11 differs from FIG. 6 referred to in the eighth embodiment described before, in the points that the core line 20 is located on the side of the dielectric substrate 12 opposite to the side thereof where an anode 24 is located, namely, on the side of the dielectric substrate 12 nearer to the tubular waveguide 11, and that the via hole 21 for electrically connecting a pad 22 and the core line 20 exists in the dielectric substrate 12.

Figure 12:
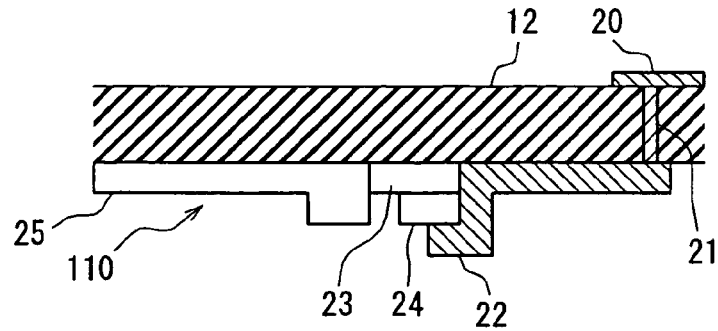
FIG. 12 is a partially enlarged cross sectional view showing the module in FIG. 11.

FIG. 12 is a detailed view of the reception means 110, the configuration of which will now be explained. The core line 20 is formed on the dielectric substrate 12 so as to extend horizontally, and the pad 22, a wiring line 25, and an SBD which is constituted by a cathode 23 and the anode 24, are disposed on the surface of the dielectric substrate 12 opposite to the surface thereof as is formed with the core line 20. The anode 24 is connected to the pad 22, and the pad 22 is connected with the core line 20 through the via hole 21. Besides, the cathode 23 is connected with the wiring line 25.

Owing to this structure, a milliwave 16 having arrived from outside is received by the core line 20 with the tubular waveguide 11 as an antenna, and it is thereafter detected and converted into a voltage by the SBD through the via hole 21. The wiring line 25, which is at a potential equal to that of the SBD, has the potential measured by a digital voltmeter, whereby the received milliwave 16 is outputted as a reception signal.

In this way, the radio-wave reception module 10 of the ninth embodiment has, not only the advantages attained by the first embodiment, but also the advantage that the parts of the reception means 110 except the core line 20 are located on the rear surface of the dielectric substrate 12, so a region where circuits and elements are arranged is large in area, and a filter circuit, etc. can be disposed in addition to the reception means 110.

Figure 13:
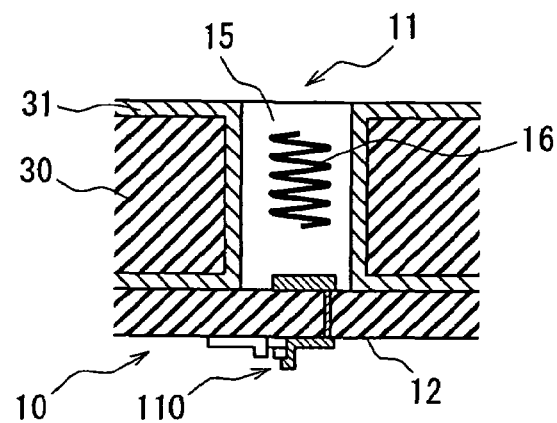
FIG. 13 is a perspective view showing a radio-wave reception module according to a modification of the ninth embodiment of the present invention.
Figure 14:
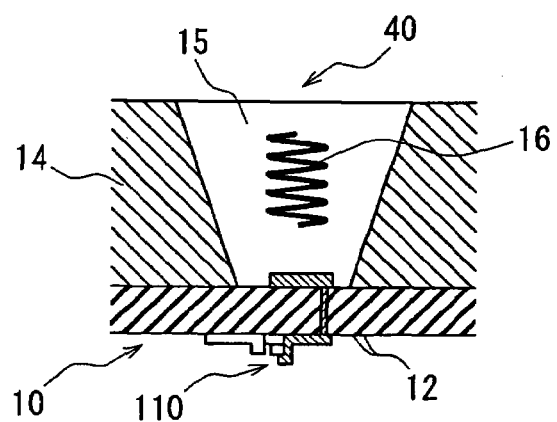
FIG. 14 is a perspective view showing a radio-wave reception module according to another modification of the ninth embodiment of the present invention.
Figure 15:
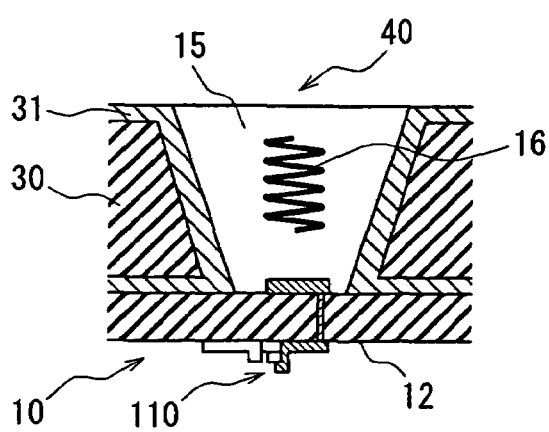
FIG. 15 is a perspective view showing a radio-wave reception module according to further another modification of the ninth embodiment of the present invention.

Incidentally, although the tubular waveguide 11 in which a penetrating hole 15 is provided in a metal plate 14 has been exemplified in the ninth embodiment, the same advantages can be attained even by a tubular waveguide 11 employing a semi-insulating Si plate 30 as shown in FIG. 13, a horn-shaped waveguide 40 employing a metal plate 14 as shown in FIG. 14, or a horn-shaped waveguide 40 employing a semi-insulating Si plate 30 as shown in FIG. 15. In FIG. 13, the module 10 includes the waveguide 1 having a cylindrical shape, the reception means 110 other than the core line 20 is disposed on a side of the substrate 12, on which the waveguide 40 does not contact, and the waveguide 11 includes the plating layer 31. In FIG. 14, the module 10 includes the waveguide 40 having a horn shape, and the reception means 110 other than the core line 20 is disposed on a side of the substrate 12, on which the waveguide 40 does not contact. FIG. 15, the module 10 includes the waveguide 40 having a horn shape, the reception means 110 other than the core line 20 is disposed on a side of the substrate 12, on which the waveguide 40 does not contact, and the waveguide 40 includes the plating layer 31.

Tenth Embodiment

A tenth embodiment will be described with reference to FIG. 16 through FIG. 18B. In the tenth embodiment, there will be explained an imaging sensor 160 which employs a plurality of radio-wave reception modules as described in the fifth embodiment before. Incidentally, constituents equivalent to those of the foregoing embodiments are assigned the same reference numerals as in the foregoing embodiments, and they shall be omitted from the description of the tenth embodiment.

Figure 16:
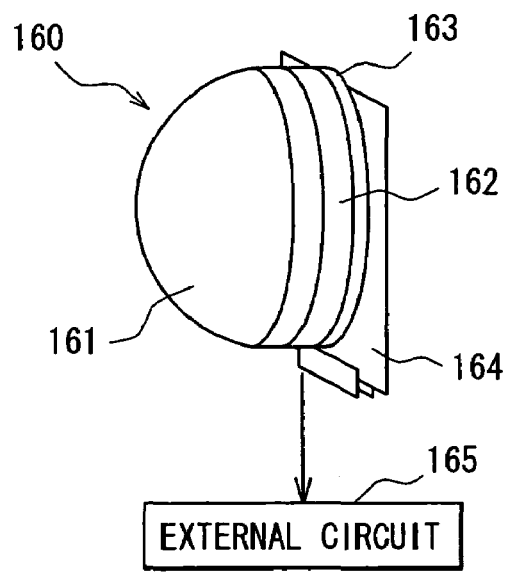
FIG. 16 is a block diagram showing an imaging sensor according to a tenth embodiment of the present invention.

FIG. 16 illustrates an exterior view of the imaging sensor 160. As shown in FIG. 16, the imaging sensor 160 includes the five constituents of a lens portion 161, a waveguide portion 162, a reception portion 163, a measurement portion 164 and an external circuit 165. The modules 10 in the sensor 160 are arranged to be an array.

The imaging sensor 160 is installed on, for example, a vehicle. It can detect milliwaves 16 which are emitted from a moving object, such as a pedestrian outside the vehicle or another vehicle, or a stationary object such as a wall or a guardrail, by itself, so as to recognize the image of the object.

Figures 17A, 17B, 17C, 17D:
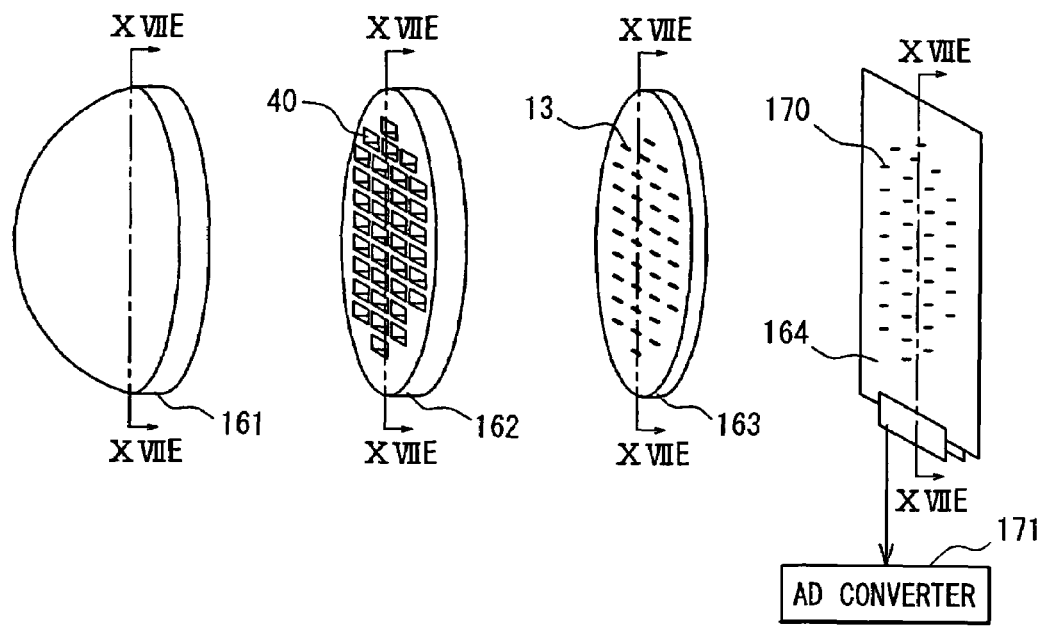
FIG. 17A is a perspective view showing a lens portion.
FIG. 17B is a perspective view showing a waveguide portion.
FIG. 17C is a perspective view showing a reception portion.
FIG. 17D is a perspective view showing a measurement portion.

The details of the individual portions will be explained with reference to FIGS. 17A through 17E. FIG. 17A is a detailed view of the lens portion 161 which is formed of a dielectric material. The lens portion 161 is located in superposition on the surface of the waveguide portion 162 on the milliwave (16) input side thereof.

FIG. 17B is a detailed view of the waveguide portion 162. The waveguide portion 162 includes a large number of horn-shaped waveguides 40 in the shape of an array. The lens portion 161 is located in superposition on the surface of the waveguide portion 162 on the milliwave (16) input side thereof, while the reception portion 163 is located in superposition on the surface of the waveguide portion 162 on the milliwave (16) output side thereof.

FIG. 17C is a detailed view of the reception portion 163. The reception portion 163 is constituted by a dielectric substrate 12 made of a dielectric material, for example, alumina, and a plurality of reception means 13. On the surface of the dielectric substrate 12 on the waveguide portion (162) side thereof, the reception means 13 are located in the shape of an array in one-to-one correspondence with the penetrating holes 15 of the horn-shaped waveguides 40. The individual horn-shaped waveguides 40 and the respectively corresponding reception means 13 are arranged on the focal plane of the lens portion 161. Besides, the reception portion 163 is sandwiched in between the waveguide portion 162 located on the surface of this reception portion 163 on the milliwave (16) input side thereof and the measurement portion 164 located on the surface of this reception portion 163 on the milliwave (16) output side thereof.

FIG. 17D is a detailed view of the measurement portion 164 and the external circuit 165. On the surface of the measurement portion 164 on the dielectric portion (163) side thereof, a plurality of measurement means 170 are located in one-to-one correspondence with the respective reception means 13. The outputs of all the measurement means 170 are inputted to A/D conversion means 171 which forms a part of the external circuit 165.

Figure 17E:
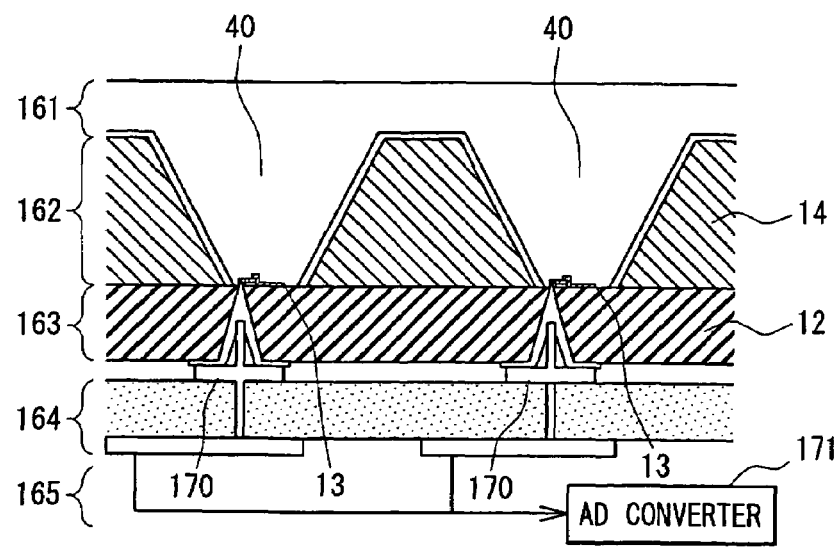
FIG. 17E is a cross sectional view showing the imaging sensor taken along line XVIIE-XVIIE in FIGS. 17A to 17D, according to the tenth embodiment.

FIG. 17E illustrates a part of a sectional view taken along line XVIIE-XVIIE in FIGS. 17A through 17D. As shown in FIG. 17E, the internal parts of the horn-shaped waveguides 40 are filled up with the same material as a dielectric material of which the lens portion 161 is made.

Figures 18A, 18B:
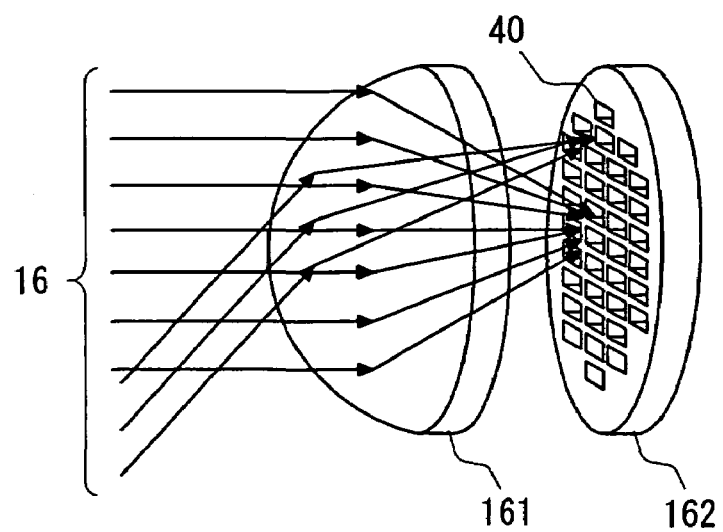
FIGS. 18A and 18B are schematic diagrams showing a relationship among a lens portion, a waveguide and a milliwave in the sensor according to the tenth embodiment.

FIGS. 18A and 18B show the relationship among the inputted milliwaves 16, the lens portion 161 and the horn-shaped waveguides 40. As shown in FIG. 18A, the individual milliwaves 16 inputted to the lens portion 161 are refracted by this lens portion 161. Further, as shown in FIG. 18B, the refracted milliwaves 16 are inputted to the horn-shaped waveguides 40, and they are received by the respective reception means 13 which exist at the innermost parts of the corresponding horn-shaped waveguides 40. The reception waves 16 received by the respective reception means 13 are converted into reception signals being electric signals, by the corresponding measurement means 170, and the electric reception signals are outputted to the external circuit 165. Incidentally, the individual reception signals represent the temperatures of the object to-be-detected which has emitted the received milliwaves 16. Further, the reception signals are processed by the external circuit 165 including the A/D conversion means 171, whereby the shape of the object can be decided.

Owing to these configurations, the imaging sensor 160 proposed in this embodiment can realize an imaging sensor of small depthwise dimension by arranging the radio-wave reception modules 10 as described before, in the shape of the array. Besides, the shape of the object having outputted the milliwaves 16 can be decided by processing the reception signals outputted from the radio-wave reception modules 10.

Eleventh Embodiment

An eleventh embodiment will be described with reference to FIG. 19. The point of the configurational difference of the eleventh embodiment from the tenth embodiment described above is that this embodiment consists in an imaging sensor 190 which decides the shape of an object by driving one radio-wave reception module 10 on a plane perpendicular to milliwaves 16 outputted from a lens portion 161. Incidentally, constituents equivalent to those of the foregoing embodiments are assigned the same reference numerals as in the foregoing embodiments, and they shall be omitted from the description of the eleventh embodiment.

Figure 19:
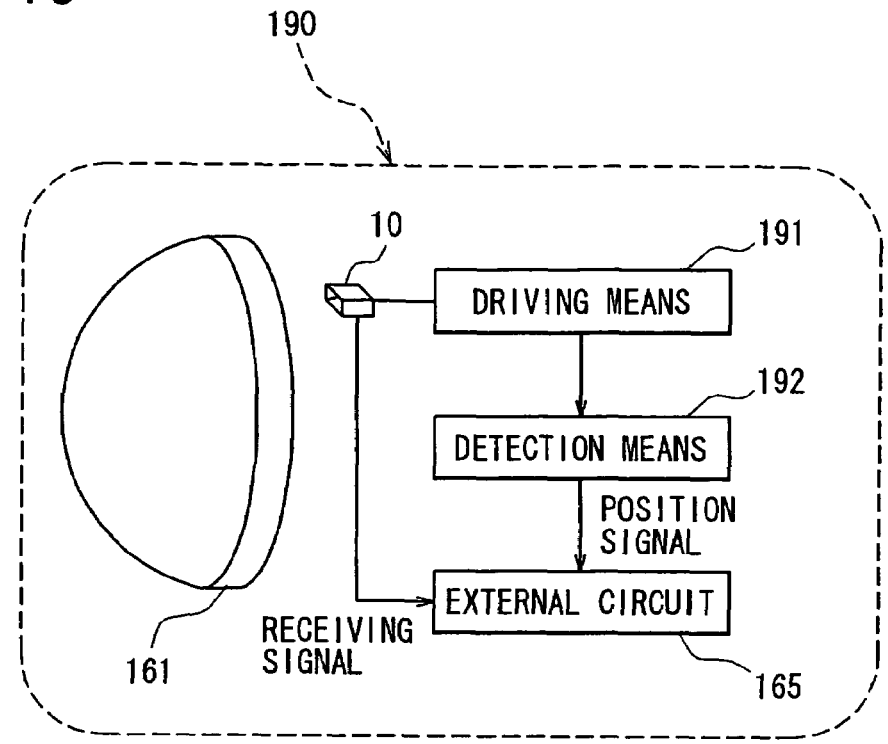
FIG. 19 is a block diagram showing an imaging sensor according to an eleventh embodiment of the present invention.
Figure 20:
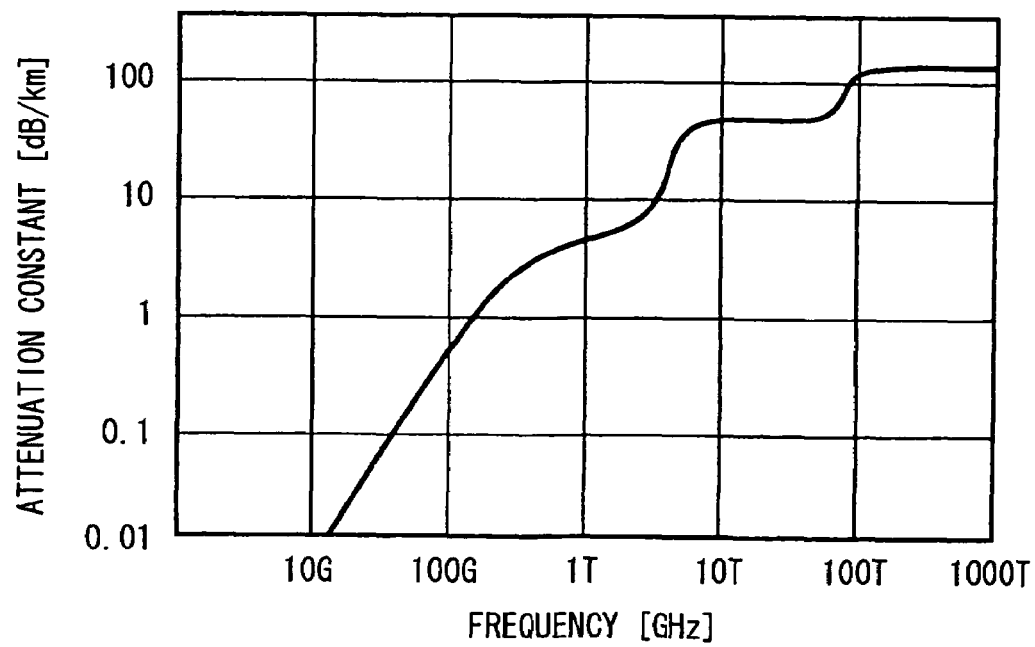
FIG. 20 is a graph showing a relationship between attenuation constant and frequency of a radio-wave in a mist atmosphere.

FIG. 19 illustrates an exterior view and a block diagram of the imaging sensor 190. As shown in FIG. 19, the imaging sensor 190 includes the lens portion 161, the radio-wave reception module 10, drive means 191, position detection means 192 and an external circuit 165. The sensor 190 includes one module 10.

The drive means 191 drives the radio-wave reception module 10 vertically and laterally in the plane which is perpendicular to the input direction of the milliwaves 16 from the lens portion 161, and within a range in which the milliwaves 16 are refracted by the lens portion 161. Besides, the position detection means 192 measures the position of the radio-wave reception module 10 which is moved by the drive means 191, and it outputs the measured position as position information to the external circuit 165. The external circuit 165 processes reception signals successively outputted from the radio-wave reception module 10, and the position information items of this radio-wave reception module 10. Thus, the intensities of the milliwaves 16 which the radio-wave reception module 10 has received can be obtained together with the positions of this radio-wave reception module 10 relative to the lens portion 161, and the shape of the object having emitted the milliwaves 16 can be decided on the basis of the positions and the intensities.

In this way, notwithstanding that the imaging sensor 190 proposed in the eleventh embodiment brings forth the advantages attained by the tenth embodiment, it has the simple configuration which uses the single radio-wave reception module 10.

(Modifications)

In a case where, in each of the above embodiments, a switch which changes-over the connection between the reception element and the external circuit 165 and the connection between the ground and the external circuit 165 is interposed between the reception element and the external circuit 165, a reception signal containing noise, and the noise can be alternately inputted to the external circuit 165. Thus, the reception signal which does not contain the noise can be extracted by subtracting the noise from the reception signal which contains this noise, and even when the milliwave 16 is feeble, it can be measured.

In a case where, in each of the above embodiments, a band-pass filter which passes only the frequencies of a predetermined bandwidth is located between the reception element and the external circuit (165), a noise component can be removed, and even when the milliwave 16 is feeble, it can be measured.

In a case where, in each of the above embodiments, a delay circuit is located between the reception element and the external circuit (165), the phase of a received reception signal can be changed.

Although the material for forming the lens portion 161 is the dielectric material in each of the tenth and the eleventh embodiments, the invention can be performed even when the material is a semiconductor. In a case where the lens portion 161 is formed of the semiconductor, a refractive index can be made higher than in the case where it is formed of the dielectric material.

Although, in each of the tenth and the eleventh embodiments, the lens portion 161 is employed as the means for refracting the milliwave 16, it may well be replaced with a mirror.

Although the shape of the core line 20 is not especially restricted in each of the foregoing embodiments, a line shape of, for example, microstrip type or coplanar type can be selected in conformity with the shape of a transmission/reception element which is to be connected.

Although the SBD has been exemplified as the reception element in the reception means 13, 60 or 110 in each of the foregoing embodiments, the reception element is not restricted to this SBD. The invention can be performed with, for example, a P-N diode.

Although, regarding the shapes of the waveguides, the tubular waveguide 11 and the horn-shaped waveguide 40 have been exemplified in the foregoing embodiments, the shape of the waveguide is not restricted to the exemplary shapes. The invention can be performed with, for example, a waveguide in the shape of a truncated cone. Besides, the waveguide need not always be in the shape in which the penetrating hole 15 is provided in the metal plate 14 or the like. It is also allowed, for example, that a tube made of a conductor is employed, and that the dielectric substrate 12, etc. are located so as to close the opening of one end of the tube.

Although, in each of the foregoing embodiments, the waveguide 11 or 40 has been explained as being made of the conductor 31 entirely or at its surface, it may well be in a shape in which the inner peripheral part thereof is made of a dielectric material, and the dielectric material is surrounded with a conductor. That is, the embodiment can be incarnated even when the waveguide 11 or 40 is in a form in which the penetrating hole 15 is provided in the dielectric material, the tube of the conductor is buried inside the penetrating hole 15, and the dielectric material is further buried inside the tube of the conductor.

Although, in each of the foregoing embodiments, the interior of the tubular waveguide 11 or the horn-shaped waveguide 40 has been explained as being filled up with the dielectric material, it need not always be filled up with the dielectric material. By way of example, the interior may well be vacuum or be filled up with a gas or semiconductor.

Although the radio-wave reception module 10 employing the reception means 13, 60 or 110 has been explained in each of the first to the eleventh embodiments described before, a radio-wave transmission module 10 which transmits the milliwave 16 can be fabricated in case of replacing the reception means 13, 60 or 110 with transmission means. Thus, various CWs or modulation waves can be transmitted by a small-sized structure.

The present invention has following aspects.

An electric wave transmitting/receiving module includes: a waveguide including a conductive member and an opening, wherein the conductive member is disposed on an inner periphery of the opening of the waveguide, and wherein the opening of the waveguide faces a transmitting side of a transmitting electric wave and/or a receiving side of a receiving electric wave; a dielectric substrate perpendicular to a transmitting direction of the transmitting electric wave and/or a receiving direction of the receiving electric wave, and disposed on a side opposite to the opening of the waveguide; and transmitting/receiving means for transmitting the transmitting electric wave and/or for receiving the receiving electric wave. The transmitting/receiving means includes a core line, a transmitting/receiving element, and a wire. The core line is horizontally disposed on the dielectric substrate. The core line transmits the transmitting electric wave and/or receives the receiving electric wave. The transmitting/receiving element is horizontally disposed on the substrate. The transmitting/receiving element outputs a transmitting/receiving signal corresponding to the transmitting electric wave and/or the receiving electric wave. The wire sends the transmitting/receiving signal from the transmitting/receiving element to an external circuit.

In the above module, since the waveguide is used for transmitting and/or receiving the electric wave, the module can inputs and/or outputs the electric wave having a wide bandwidth. Further, the transmitting/receiving means is horizontally formed on the substrate, which is disposed at the bottom of the waveguide, so that the dimensions of the module are minimized.

Alternatively, the core line and the transmitting/receiving element may be disposed on a same side of the dielectric substrate, which faces the waveguide. The wire electrically connects between the transmitting/receiving element and the external circuit. The external circuit is disposed on a side of the dielectric substrate, which is opposite to the waveguide. In this case, the wire is formed at least on the side opposite to the waveguide, so that design degree of freedom in the wire is improved.

Alternatively, the core line, the transmitting/receiving element and the wire may be disposed on a same side of the dielectric substrate, which is opposite to the waveguide, and the wire electrically connects between the transmitting/receiving element and the external circuit. In this case, the transmitting/receiving means is formed on the side opposite to the waveguide. Thus, the transmitting/receiving means can include a large element and multiple circuits. For example, in case of the electric wave receiving module, the receiving means may have a low noise amplifier so that sensitivity of the module is improved. Further, a via hole for the wire is not necessitated for the module. Thus, a complicated design and manufacturing steps are eliminated.

Alternatively, the core line may be disposed on a side of the dielectric substrate, which faces the waveguide. The transmitting/receiving element may be disposed on a side of the dielectric substrate, which is opposite to the waveguide. The transmitting/receiving means further includes a second wire. The second wire electrically connects between the transmitting/receiving element and the core line, and the wire electrically connects between the transmitting/receiving element and the external circuit.

Alternatively, the opening of the waveguide may be provided by a through hole for transmitting and/or receiving the electric wave. The conductive member of the waveguide is disposed on the inner periphery of the through hole, and the through hole is perpendicular to the dielectric substrate. In this case, the waveguide can be easily manufactured, compared with a tapered slot antenna.

Alternatively, the opening of the waveguide may be provided by a cavity for transmitting and/or receiving the electric wave. The conductive member of the waveguide is disposed on the inner periphery of the cavity. The cavity has a circular truncated corn shape having two circular openings. The circular truncated corn shape has an axis perpendicular to the dielectric substrate. The circular truncated corn shape is provided by rotating a predetermined quadrangle around the axis. In this case, the directivity of the waveguide is sharpened.

Alternatively, the opening of the waveguide may be provided by a cavity for transmitting and/or receiving the electric wave. The conductive member of the waveguide is disposed on the inner periphery of the cavity, and the cavity has a hexahedron shape. Further, the hexahedron shape of the cavity of the waveguide may have two openings. One opening of the cavity faces the transmitting side of the transmitting electric wave and/or the receiving side of the receiving electric wave, the one opening being larger than the other opening of the cavity, and the other opening of the cavity faces the dielectric substrate. In this case, the module has high sensitivity and high gain.

Alternatively, the waveguide may be composed of the conductive member. Alternatively, the waveguide further includes a semiconductor member, and the conductive member is surrounded with the semiconductor member. Alternatively, the waveguide further includes an insulation member, and the conductive member is surrounded with the insulation member. Alternatively, the substrate includes a semiconductor layer epitaxially disposed on the dielectric substrate, and the transmitting/receiving element is disposed in the semiconductor layer. In this case, the transmitting/receiving means can be provided by a MMIC (i.e., millimeter-wave monolithic IC). Therefore, a high frequency circuit can be formed with high accuracy, so that reflection loss and the like in the module are improved. Further, the processing yield of the module is improved. Alternatively, the transmitting/receiving element is mounted on or electrically connected to the dielectric substrate. In this case, the transmitting/receiving means can be formed by mounting an IC chip, so that combination degree of freedom for the transmitting/receiving means is improved.

Alternatively, the transmitting/receiving element includes a Schottky Barrier diode. In this case, the sensitivity of the module is comparatively higher than a case of a bolometer made of bismuth. Further, even when atmospheric temperature around the module is high, the module can input and output the transmitting/receiving signal with high accuracy.

Alternatively, the module further includes a switch disposed between the transmitting/receiving element and the external circuit. The switch is capable of alternately switching between the transmitting/receiving signal to be inputted to the external circuit and noise in the transmitting/receiving signal to be inputted to the external circuit. In this case, even when weak receiving electric wave is inputted into the module, by using the Dicke method, the wave can be detected, so that the sensitivity of the module is much improved.

Alternatively, the module further includes a filter for passing only a component of the transmitting/receiving signal disposed in a predetermined bandwidth. The filter is disposed between the core line and the external circuit so that the component of the transmitting/receiving signal is only inputted into the external circuit. When the bandwidth of weak electric wave is obvious, the weak electric wave is detected by the module.

Alternatively, the muddle further includes a delay circuit for delaying a timing of input and/or output of the transmitting/receiving signal to the external circuit. The delay circuit is disposed between the core line and the external circuit. In this case, the phase of the electric wave can be changed. For example, when the module detects a receiving electric wave, the phase of the receiving electric wave is changed by the delay circuit.

Alternatively, the module further includes a lens for focusing and/or refracting the electric wave along with a traveling direction of the electric wave. The electric wave outputted from an object is focused on a focal plane of the lens, or an object for transmitting is focused by the lens. Thus, the object is imaged by detecting the electric wave, or the electric wave corresponding to the object is transmitted.

Alternatively, the lens is made of dielectric material such as poly-ethylene. Thus, the manufacturing step for the lens is simplified. Alternatively, the lens is made of semiconductor material. Thus, refractive index of the lens can be increased, so that the module is minimized in size.

Alternatively, the module further includes a mirror for focusing the receiving electric wave on the core line and/or for refracting the transmitting electric wave outputted from the core line. In this case, the module is provided by a reflection type module having low energy loss and simple construction.

Alternatively, the opening of the waveguide is filled with a dielectric member, and the electric wave passes through the opening. In this case, wavelength shortening effect of the dielectric member is expected, so that the dimensions of the module is minimized.

Alternatively, the opening of the waveguide is filled with a semiconductor member, and the electric wave passes through the opening. In this case, the semiconductor member having high refraction index is embedded into the waveguide, so that the dimensions of the module is minimized.

Further, an imaging sensor includes: a module array including a plurality of electric wave transmitting/receiving modules. The electric wave transmitting/receiving modules are disposed to be a predetermined array. The lens in each electric wave transmitting/receiving module is disposed on an opening side of the electric wave transmitting/receiving module, and the external circuit is capable of processing the transmitting/receiving signal outputted from each electric wave transmitting/receiving module. The imaging sensor can detect the shape of an object. The dimensions of the sensor in the depth direction is minimized.

Furthermore, an imaging sensor includes: a electric wave transmitting/receiving module; driving means for moving the electric wave transmitting/receiving module in a predetermined area; and position detection means for detecting a positioning of the electric wave transmitting/receiving module in the predetermined area and for outputting a positioning signal. The lens refracts and focuses the receiving electric wave on the opening of the electric wave transmitting/receiving module, and the external circuit is capable of processing the transmitting/receiving signal and the positioning signal. The imaging sensor can detect the shape of an object. The construction of the sensor is simplified.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An electromagnetic wave receiving module comprising:
a waveguide including a conductive member and an opening, wherein the conductive member is disposed on an inner periphery of the opening of the waveguide, and wherein an electromagnetic wave is received through the opening in the waveguide;
a dielectric substrate perpendicular to traveling direction of the received electromagnetic wave, and disposed opposite to the opening of the waveguide; and
receiving means for receiving the electromagnetic wave, wherein
the receiving means includes a core line, a receiving element, and a wire,
the core line is horizontally disposed on the dielectric substrate,
the core line receives the electromagnetic wave,
the receiving element is horizontally disposed on the substrate,
the receiving element outputs a reception signal corresponding to the received electromagnetic wave, and
the wire sends the reception signal from the receiving element to an external circuit.

2. The module according to claim 1, wherein
the core line and the receiving element are disposed on a same side of the dielectric substrate, which faces the waveguide,
the wire electrically connects between the receiving element and the external circuit, and
the external circuit is disposed on a side of the dielectric substrate, which is opposite to the waveguide.

3. The module according to claim 1, wherein
the core line, the receiving element and the wire are disposed on a same side of the dielectric substrate, which is opposite to the waveguide, and
the wire electrically connects between the receiving element and the external circuit.

4. The module according to claim 1, wherein
the core line is disposed on a side of the dielectric substrate, which faces the waveguide,
the receiving element is disposed on a side of the dielectric substrate, which is opposite to the waveguide,
the receiving means further includes a second wire, the second wire electrically connects between the receiving element and the core line, and
the wire electrically connects between the receiving element and the external circuit.

5. The module according to claim 1, wherein
the opening of the waveguide is provided by a through hole for receiving the electromagnetic wave,
the conductive member of the waveguide is disposed on the inner periphery of the through hole, and
the through hole is perpendicular to the dielectric substrate.

6. The module according to claim 1, wherein
the opening of the waveguide is provided by a cavity for receiving the electromagnetic wave,
the conductive member of the waveguide is disposed on the inner periphery of the cavity,
the cavity has a circular truncated cone shape having two circular openings, the circular truncated cone shape has an axis perpendicular to the dielectric substrate, and
the circular truncated cone shape is provided by rotating a predetermined quadrangle around the axis.

7. The module according to claim 1, wherein
the opening of the waveguide is provided by a cavity for receiving the electromagnetic wave,
the conductive member of the waveguide is disposed on the inner periphery of the cavity, and
the cavity has a hexahedron shape.

8. The module according to claim 7, wherein
the hexahedron shape of the cavity of the waveguide has two openings,
the electromagnetic wave is receivied through one opening of the cavity, the one opening being larger than the other opening of the cavity, and
the other opening of the cavity faces the dielectric substrate.

9. The module according to claim 1, wherein the waveguide is composed of the conductive member.

10. The module according to claim 1, wherein the waveguide further includes a semiconductor member, and the conductive member is surrounded with the semiconductor member.

11. The module according to claim 1, wherein the waveguide further includes an insulation member, and the conductive member is surrounded with the insulation member.

12. The module according to claim 1, wherein
the substrate includes a semiconductor layer epitaxially disposed on the dielectric substrate, and
the receiving element is disposed in the semiconductor layer.

13. The module according to claim 1, wherein the receiving element is mounted on or electrically connected to the dielectric substrate.

14. The module according to claim 1, wherein the receiving element includes a Schottky Baffler diode.

15. The module according to claim 1, further comprising:
a switch disposed between the receiving element and the external circuit, wherein the switch alternately switches between input of the reception signal with noise to the external circuit and input of only the noise included in the reception signal to the external circuit.

16. The module according to claim 1, further comprising: a filter for passing only a component of the reception signal disposed in a predetermined bandwidth, wherein the filter is disposed between the core line and the external circuit so that the component of the reception signal is only inputted into the external circuit.

17. The module according to claim 1, further comprising: a delay circuit for delaying a timing of input or output of the reception signal to the external circuit, wherein the delay circuit is disposed between the core line and the external circuit.

18. The module according to claim 1, further comprising: a lens for at least one of focusing and refracting the electromagnetic wave along with a traveling direction of the electromagnetic wave.

19. The module according to claim 18, wherein the lens includes a dielectric material.

20. The module according to claim 18, wherein the lens includes a semiconductor material.

21. The module according to claim 1, further comprising: a mirror for at least one of focusing the electromagnetic wave on the core line and refracting the electromagnetic wave outputted from the core line.

22. The module according to claim 1, wherein the opening of the waveguide is in vacuum, and the electromagnetic wave passes through the opening.

23. The module according to claim 1, wherein the opening of the waveguide is filled with a predetermined gas, and the electromagnetic wave passes through the opening.

24. The module according to claim 1, wherein the opening of the waveguide is filled with a dielectric member, and the electromagnetic wave passes through the opening.

25. The module according to claim 1, wherein the opening of the waveguide is filled with a semiconductor member, and the electromagnetic wave passes through the opening.

26. An imaging sensor comprising:
a module array including a plurality of electromagnetic wave receiving modules, each of the modules including:
a waveguide including a conductive member and an opening, wherein the conductive member is disposed on an inner periphery of the opening of the waveguide, and wherein an electromagnetic wave is received through the opening of the waveguide;
a dielectric substrate perpendicular to traveling direction of the received electromagnetic wave, and disposed opposite to the opening of the waveguide;
receiving means for receiving the electromagnetic wave; and
a lens for at least one of focusing and refracting the electromagnetic wave along with a traveling direction of the electromagnetic wave, wherein
the receiving means includes a core line, a receiving element, and a wire,
the core line is horizontally disposed on the dielectric substrate,
the core line receives the electromagnetic wave,
the receiving element is horizontally disposed on the substrate,
the receiving element outputs a reception signal corresponding to the received electromagnetic wave, and
the wire sends the reception signal from the receiving element to an external circuit,
the electromagnetic wave receiving modules are disposed to be a predetermined array, wherein
the lens in each electromagnetic wave receiving module is disposed on an opening side of the electromagnetic wave receiving module, and
the external circuit processes the reception signal outputted from each electromagnetic wave transmitting/receiving receiving module.

27. The sensor according to claim 26, wherein the lens in each electromagnetic wave receiving module is made of dielectric material.

28. The sensor according to claim 26, wherein the lens in each electromagnetic wave receiving module is made of semiconductor material.

29. An imaging sensor comprising:
a electromagnetic wave receiving module, including:
a waveguide including a conductive member and an opening, wherein the conductive member is disposed on an inner periphery of the opening of the waveguide, and wherein an electromagnetic wave is received through the opening of the waveguide;
a dielectric substrate perpendicular to a traveling direction of the received electromagnetic wave, and disposed opposite to the opening of the waveguide;
receiving means for receiving the electromagnetic wave; and
a lens for at least one of focusing and refracting the electromagnetic wave along with a traveling direction of the electromagnetic wave, wherein the receiving means includes a core line, a receiving element, and a wire, the core line is horizontally disposed on the dielectric substrate, the core line receives the electromagnetic wave, the receiving element is horizontally disposed on the substrate, the receiving element outputs a reception signal corresponding to the received electromagnetic wave, and the wire sends the reception signal from the receiving element to an external circuit;
driving means for moving the electromagnetic wave receiving module in a predetermined area; and
position detection means for detecting a positioning of the electromagnetic wave receiving module in the predetermined area and for outputting a positioning signal, wherein
the lens refracts and focuses the received electromagnetic wave on the opening of the electromagnetic wave receiving module, and the external circuit processes the receiving signal and the positioning signal.

30. The sensor according to claim 29, wherein the lens in the electromagnetic wave receiving module includes a dielectric material.

31. The sensor according to claim 29, wherein the lens in the electromagnetic wave receiving module includes a semiconductor material.

* * * * *